(12) United States Patent
Koller

(10) Patent No.: US 6,756,990 B2
(45) Date of Patent: Jun. 29, 2004

(54) IMAGE FILTERING ON 3D OBJECTS USING 2D MANIFOLDS

(75) Inventor: Dieter O. Koller, Sunnyvale, CA (US)

(73) Assignee: Be Here Corporation, Fremont, CA (US)

( * ) Notice: Subject to any disclaimer, the term of this patent is extended or adjusted under 35 U.S.C. 154(b) by 258 days.

(21) Appl. No.: 09/825,724

(22) Filed: Apr. 3, 2001

(65) Prior Publication Data

US 2002/0140702 A1 Oct. 3, 2002

(51) Int. Cl.[7] ............................ G09G 5/00; G06T 15/00
(52) U.S. Cl. ...................................... 345/582; 345/419
(58) Field of Search ................................ 345/582, 581, 345/583–588, 552, 419–427, 441, 442; 382/199, 154, 294, 285; 348/266–280

(56) References Cited

U.S. PATENT DOCUMENTS

| | | | | |
|---|---|---|---|---|
| 3,582,961 A | * | 6/1971 | Shindo | 348/44 |
| 5,410,644 A | * | 4/1995 | Thier et al. | 345/582 |
| 5,446,833 A | * | 8/1995 | Miller et al. | 345/585 |
| 5,877,770 A | * | 3/1999 | Hanaoka | 345/587 |
| 6,005,580 A | * | 12/1999 | Donovan | 345/428 |
| 6,009,190 A | * | 12/1999 | Szeliski et al. | 382/154 |
| 6,154,216 A | * | 11/2000 | Walton | 345/619 |
| 6,317,139 B1 | * | 11/2001 | Williams | 345/634 |
| 6,417,861 B1 | * | 7/2002 | Burgard et al. | 345/589 |
| 6,456,287 B1 | * | 9/2002 | Kamen et al. | 345/427 |
| 6,459,433 B1 | * | 10/2002 | Walton | 345/582 |
| 6,515,673 B1 | * | 2/2003 | Hashimoto et al. | 345/582 |
| 6,559,853 B1 | * | 5/2003 | Hashimoto et al. | 345/582 |
| 2002/0070947 A1 | * | 6/2002 | Dorbie et al. | 345/582 |
| 2002/0075274 A1 | * | 6/2002 | Walton | 345/582 |
| 2002/0180748 A1 | * | 12/2002 | Popescu et al. | 345/582 |

OTHER PUBLICATIONS

"Creating raster omnimax images from multiple perspective views using the elliptical weighted average filter", Greene et al, Jun. 1986, IEEE Computer graphics and applications 6(6), p. 21–27.*

"Synthetic texturing using digital filters", Feibush et al, 1980, ACM, p. 294–301.*

* cited by examiner

*Primary Examiner*—Michael Razavi
*Assistant Examiner*—Ryan Yang
(74) *Attorney, Agent, or Firm*—Bever, Hoffman & Harms; Edward S. Mao

(57) ABSTRACT

A method and system for filtering a texture map representing three-dimensional objects or texture projections of environments is provided. Specifically, the three-dimensional object or texture projection is divided into a plurality of faces, which are stored in the texture map. Filtering of a texel or pixel near the edge of a first face includes a plurality of texels from the second face. A pointer and a stride parameter are stored in the texture map and used in the selection of the texels from the second face to be used in the filtering of the texel in the first face.

17 Claims, 8 Drawing Sheets

IMAGE FILTERING ON 3D OBJECTS USING 2D MANIFOLDS

BACKGROUND OF THE INVENTION

1. Field of the Invention

The present invention relates to digital image and video processing. More specifically, the present invention relates to methods of image filtering the surfaces of three-dimensional (3D) objects and texture projections.

2. Discussion of Related Art

Traditionally, digital images are captured, displayed and processed as a rectangle in two dimensions. As illustrated in FIG. 1, a digital image 100 comprises a plurality of picture elements (pixels). Specifically, digital image 100 comprises Y rows of X pixels. For clarity, pixels in an digital image are identified using a two-dimensional coordinate system. As shown in FIG. 1, pixel P(0,0) is in the top left corner of digital image 100. Pixel P(X-1,0) is in the top right corner of digital image 100. Pixel P(0,Y-1) is in the bottom left corner and pixel P(X-1, Y-1) is in the bottom right corner.

Many linear image filtering techniques to perform such tasks as noise reduction, edge detection, and image enhancement, have been developed for use with the traditional two-dimensional digital image. A linear filter operation is usually implemented as a discrete convolution operation with the convolution kernal being the filter kernel or filter mask. This process is illustrated in FIG. 2, where a moving window mask, usually referred to as a filter mask, centered around a particular pixel is moved across the image. The value of the center pixel, i.e., the center pixel value, is re-assigned a value equal to the sum of each filter kernel value multiplied with the underlying pixel value. FIG. 2 shows a digital image 200 with a filter mask 210 centered around pixel P(X, Y). Filter mask 210 is a 5×5 mask and includes 25 pixels. Specifically, filter mask 210 includes the pixels in a square having corner pixels P(X−2, Y−2), P(X+2, Y−2), P(X−2, Y+2), and P(X+2, Y+2). During an image filtering operation, filter mask 210 spans across every pixel in digital image 200 and the filtering operation is performed for each pixel. However, pixels along the 2 rows or columns on the edges of digital image 200 can not be fully processed because pixel mask 210 would not have complete data to process the pixels at the edges. Generally, these border pixels are either not filtered or filtered using predefined border parameters. For example, some image processing systems define additional pixels around digital image 200 to allow filtering of the border pixels of digital image 200. Typically, a dark background color is chosen for the additional pixels. Alternatively, the additional pixels may be based on the border pixels or determined through an extrapolation of the border pixels.

With increasing processing and memory capabilities, computer systems can be used for advanced graphic processing of three-dimensional imaging, such as displaying environment maps and three-dimensional objects using so-called texture maps. However, many graphic hardware systems are designed for handling texture maps only as two dimensional digital images. Furthermore, computer memory addressing is not well suited for three dimensional imaging. Thus, most graphic images are still stored and processed as two dimensional images. However, in many situations the border conditions of two dimensional texture maps do not reflect the actual conditions of the three-dimensional object or environment because the surface of the three-dimensional object or environment is represented in this texture map as a two-dimensional digital image. For example, a cylinder is "unwrapped" into a two dimensional texture map. The two dimensional texture map has a left and right border whereas the actual cylinder does not have a left or right border. Hence, there is a for a method and system to allow image filtering techniques on two-dimensional digital images to be applied to three-dimensional imaging.

SUMMARY

Accordingly, the present invention provides a method and system for applying image filters on the surfaces of three dimensional objects or environments. For example, in one embodiment of the present invention a texture map of a three-dimensional object or a texture projection of an environment having a first face and a second face is filtered by using texels from the second face to filter texels on the edges of the first face. Furthermore, texels from the first face are also used to filter texels on the edges of the second face. Generally, a texel is filtered with a filter mask surrounding the texel. However, for texels near the edges of the first face, the filter mask would extend beyond the edge of first face and contain empty spaces. However, in an embodiment of the present invention, a first-face to second-face pointer, which is associated with an edge of the first face, points to a side in the second face. Using the first-face to second-face pointer, a partial filter mask is defined in the second face. The partial filter mask includes a plurality of second-face texels which are used to filter the texel in the first face. Similarly, a texel near an edge of the second face can be filtered using a plurality of first-face texels. Furthermore, some embodiments of the present invention includes a stride parameter with the first-face to second face pointer. For example, in some embodiments, the stride parameter is the amount a memory pointer must be incremented to point to an adjacent face pixel. The stride parameter can also provides information regarding the relative orientation of the first face and the second face. In accordance with a second embodiment of the present invention, the first face and second face are stored in a texture map. Furthermore, the first-face to second-face pointer is also stored in the texture map. Furthermore, additional faces and pointers can also be stored in the texture map. Some embodiments also include the stride parameter in the texture map.

The present invention will be more fully understood in view of the following description and drawings.

DETAILED DESCRIPTION

As stated above, extensive image filtering techniques have been developed for two-dimensional images. However, the border conditions inherent in two-dimensional images do not always exists in three-dimensional objects. For example, environment mapping systems display the environment of a user on a sphere. Unlike a two-dimensional rectangle, a sphere contains no borders. Conventional environment mapping systems include an environment capture system (e.g., a camera system) that generates an environment map containing data necessary to recreate the environment of the theoretical viewer, and an environment display system that processes the environment map to display a selected portion of the recorded environment to a user of the environment mapping system. An environment display system is described in detail by Hashimoto et al., in co-pending U.S. patent application Ser. No. 09/505,337, entitled "POLYGONAL CURVATURE MAPPING TO INCREASE TEXTURE EFFICIENCY", which is incorporated herein in its entirety.

Figure 3:
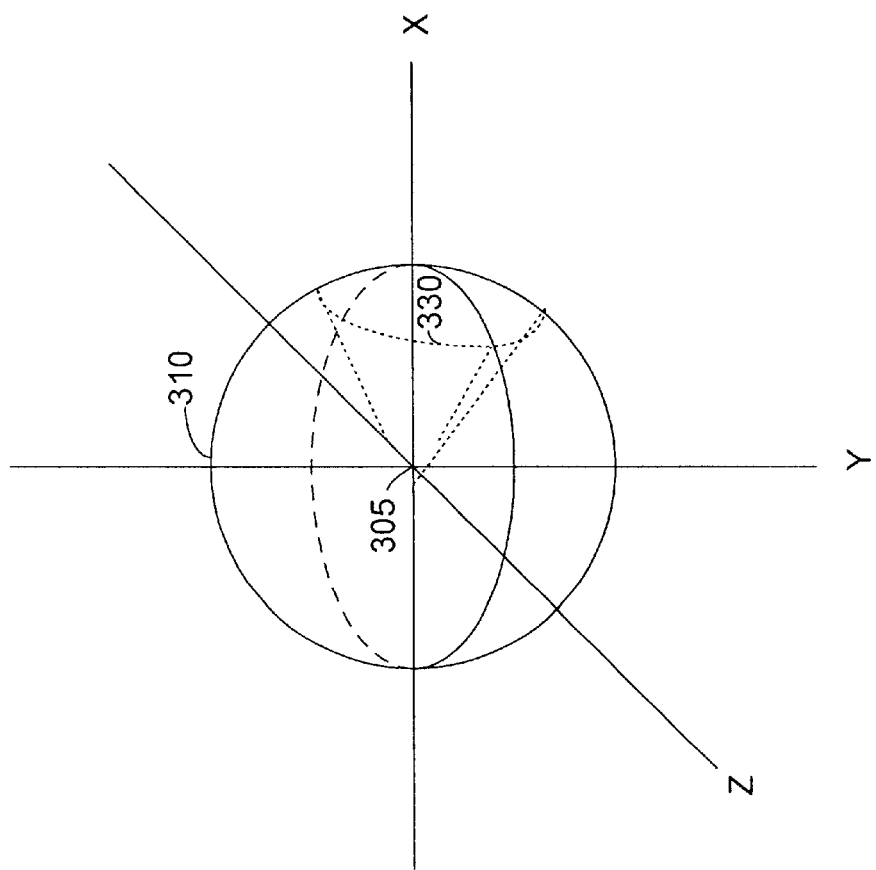
FIG. 3 is conceptual diagram of an environment.

FIG. 3 illustrates the construct used in conventional environment mapping systems. A viewer (not shown) is centered at origin 305 of a three dimensional space having x, y, and z coordinates. The environment of the viewer (i.e., what the viewer can see) is ideally represented by a sphere 310, which surrounds the viewer. Generally, for ease of calculation, sphere 310 is defined with a radius of 1 and is centered at origin 305 of the three dimensional space. More specifically, the environment of the viewer is projected onto the inner surface of sphere 310. The viewer at origin 305 has a view window 330 which defines the amount of sphere 310 the viewer can see at any given moment. View window 330 is typically displayed on a display unit for the user of the environment mapping system.

Conventional environment mapping systems include an environment capture system and an environment display system. The environment capture system creates an environment map which contains the necessary data to recreate the environment of the viewer. The environment display system uses the environment map to display view window 330 (FIG. 3) to the user of the environment mapping system. Typically, the environment capture system and the environment display system are located in different places and used at different times. Thus, the environment map must be transported to the environment display system typically using a computer network, or stored in on a computer readable medium, such as a CD-ROM or DVD.

Figure 1:
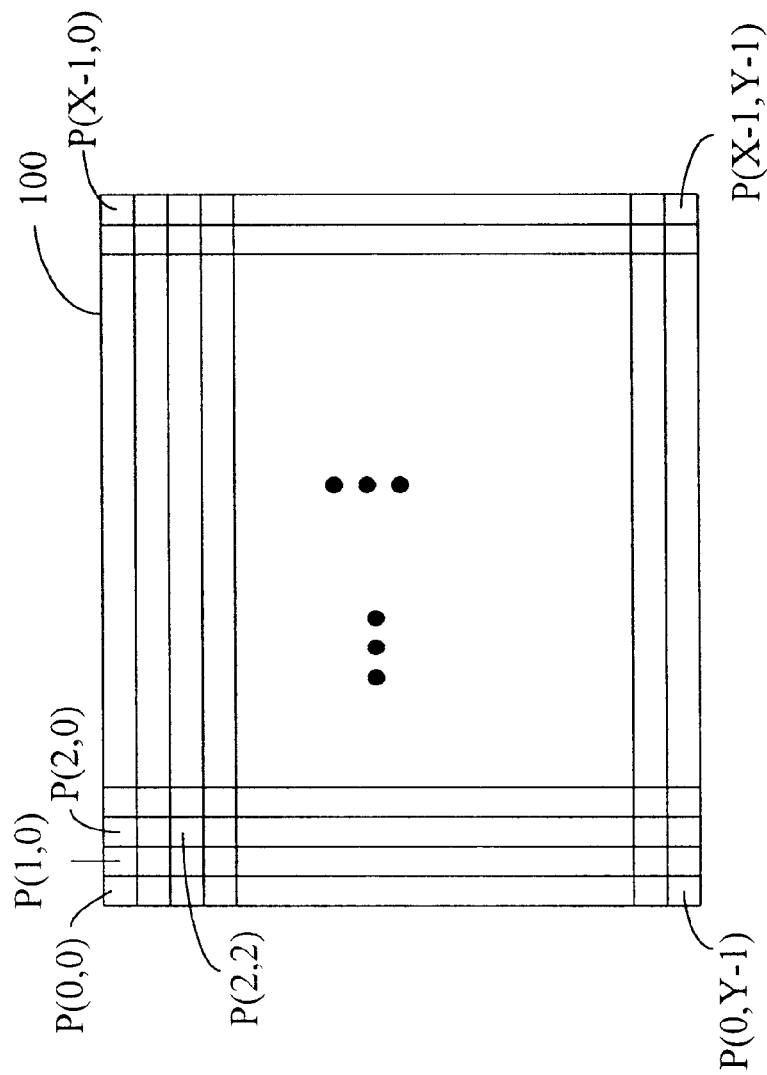
FIG. 1 is a diagram of a digital image comprising picture elements (pixels).
Figure 2:
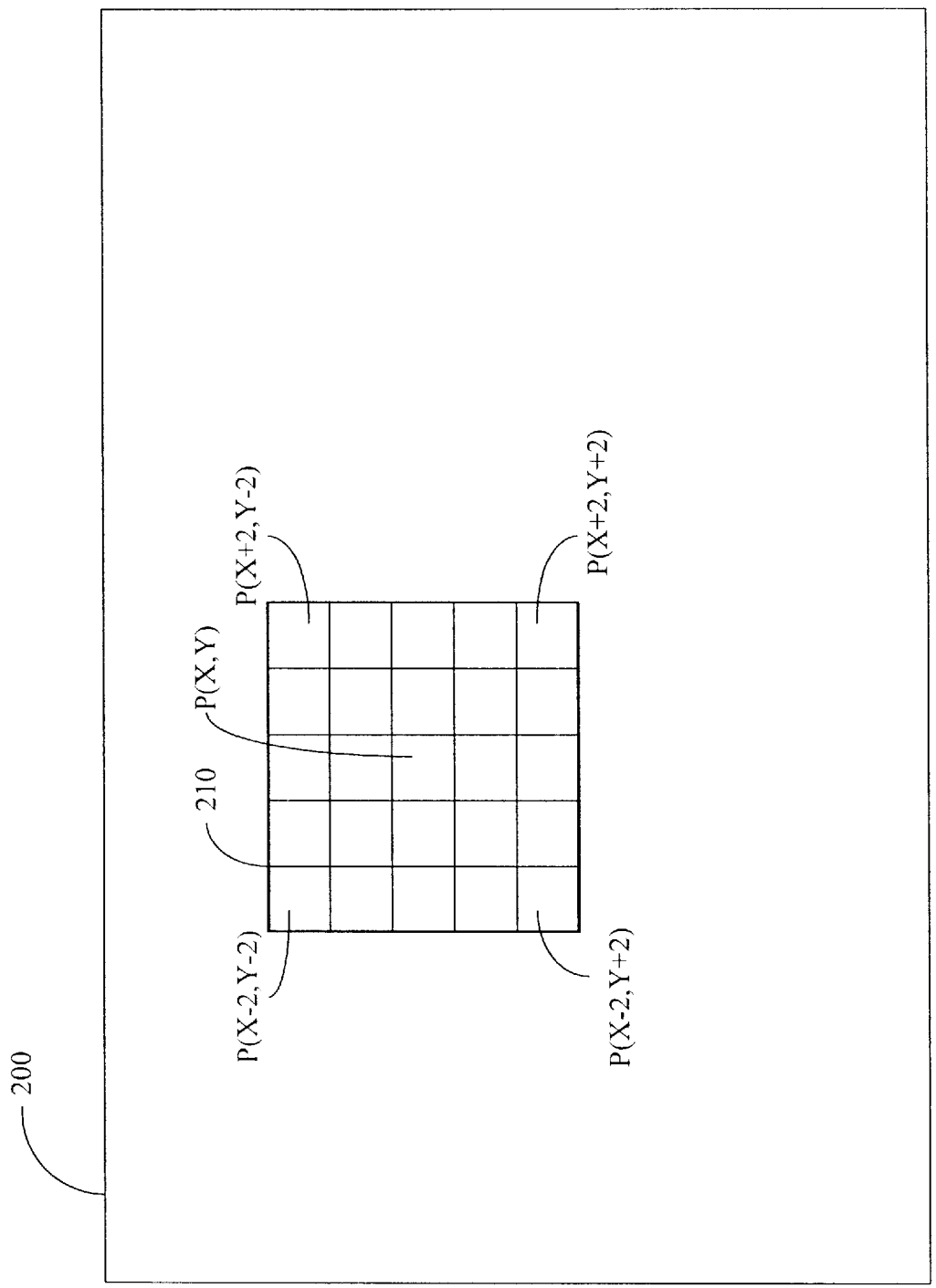
FIG. 2 is an illustration of a filtering mask in accordance with one embodiment of the present invention.
Figure 4:
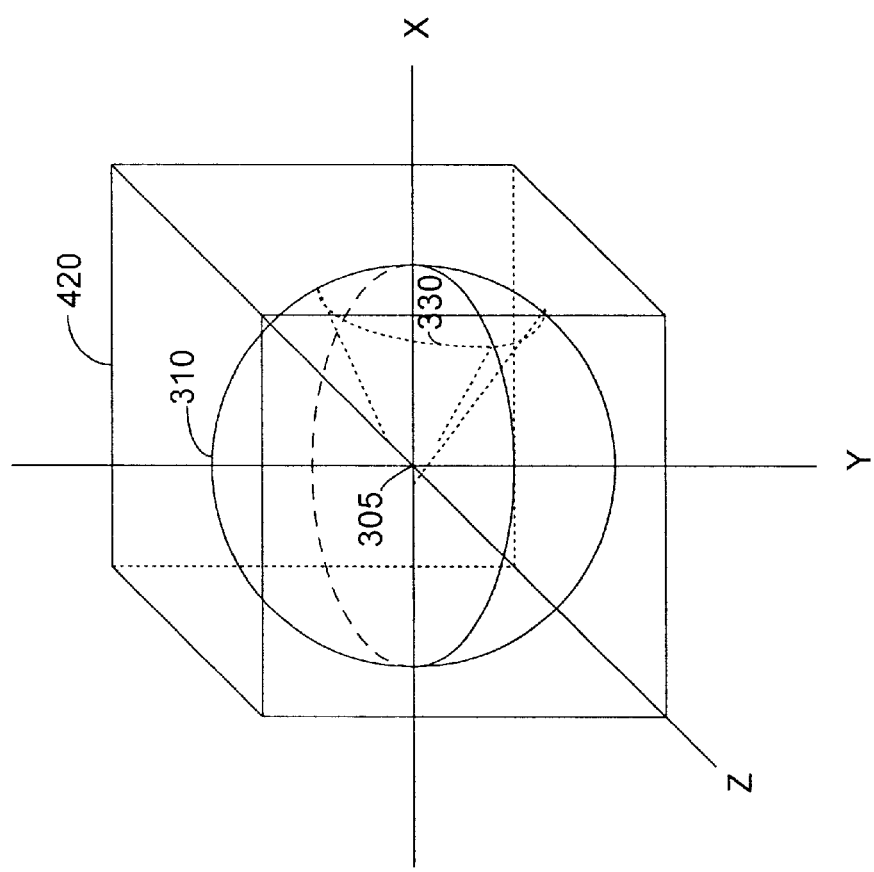
FIG. 4. is conceptual diagram of an environment encapsulated by a cube.
Figure 5:
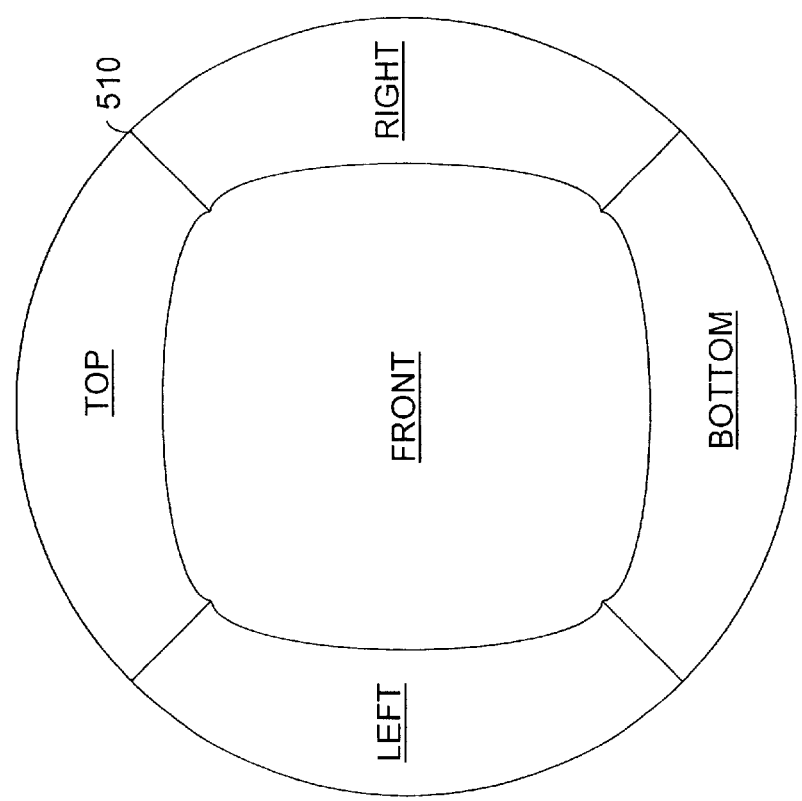
FIG. 5 is a spherical texture projection in accordance with one embodiment of the present invention.

As stated above, computer graphic systems are generally not designed to process and display spherical surfaces. Thus, as illustrated in FIG. 4, texture mapping is used to create a texture projection of the inner surface of sphere 310 onto polygonal surfaces of a regular solid (i.e., a platonic solid) having sides that are tangent to sphere 310. As illustrated in FIG. 4, a texture projection in the shape of a cube 420 surrounds sphere 310. Specifically, the environment image on the inner surface of sphere 310 serves as a texture map which is texture mapped onto the inner surfaces of cube 420. A cube is typically used because most graphics systems are optimized to use rectangular displays and a cube provides six rectangular faces. Other regular solids (i.e., tetrahedrons, octahedrons, dodecahedrons, and icosahedrons) have non-rectangular faces. The texture projection uses texture elements ("texels") which comprises one or more pixels. The faces of the cube can be concatenated together to form the environment map. During viewing, the portions of the environment map that correspond to view window 330 (FIG. 1 and FIG. 2) are displayed for the viewer. Furthermore, some embodiments of the present invention may use texture projections that more closely simulates a sphere. For example as illustrated in FIG. 5, the faces of a cube can be warped around a sphere so that the faces are tetragonal curved surfaces rather than rectangles. Specifically, FIG. 5 shows a spherical texture projection 510, which includes a top tetragonal curved surface TOP, a bottom tetragonal curved surface BOTTOM, a front tetragonal curved surface FRONT, a left tetragonal curved surface LEFT, a right tetragonal curved surface RIGHT, and a back tetragonal curved surface BACK (not shown). Each tetragonal curved surface can be repeatedly subdivided into a plurality of smaller tetragonal curved surfaces. For clarity the initial tetragonal curved surfaces are referred to as faces of the texture projection. Thus, top tetragonal curved surface TOP is hereinafter referred to as top face TOP. Texture mapping using tetragonal curved surfaces is described in detail by Hashimoto et in co-pending U.S. patent application Ser. No. 09/505,337, entitled "POLYGONAL CURVATURE MAPPING TO INCREASE TEXTURE EFFICIENCY."

Figure 6:
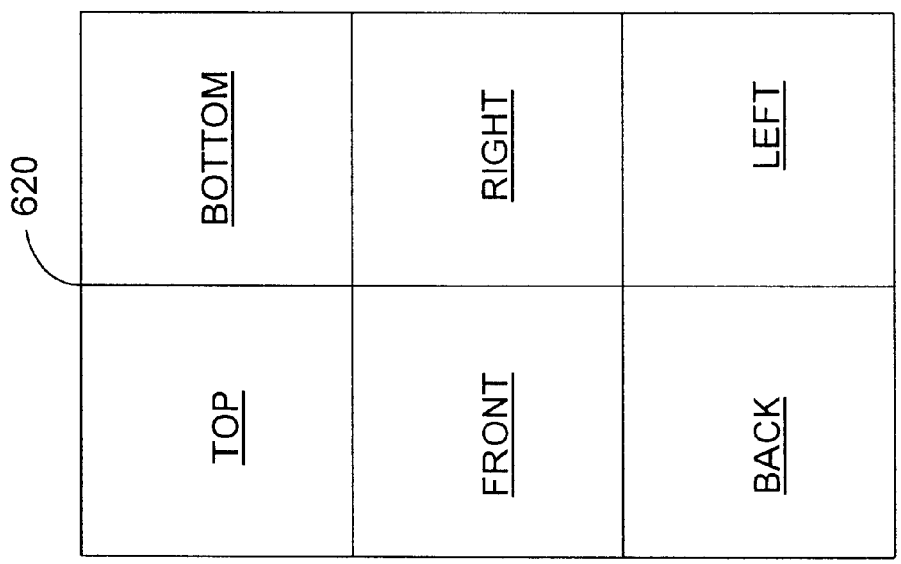
FIG. 6 is an environment map in accordance with one embodiment of the present invention.

FIG. 6 illustrates how the faces of spherical texture projection 510 are concatenated together in one embodiment of the present invention. Specifically, the faces, i.e., the initial six tetragonal curved surfaces, of spherical texture projection 510 are arranged into a rectangular environment map 620 as shown in FIG. 6. Top face TOP is in the top left corner of environment map 620, bottom face BOTTOM is in the top right corner of environment map 620, front face FRONT is in the middle of the left side of environment map 620, back face BACK is in the bottom left corner of environment map 620, left face LEFT is in the bottom right corner of environment map 620, and right face RIGHT is in the middle of the right side of environment map 620. Other embodiments of the present invention may arrange the various faces in other patterns or file formats. The environment map of FIG. 6 can also be used with the cubic projection of FIG. 4.

Conventional filtering techniques could be applied to each face of spherical texture projection 510 in environment map 620 using standard techniques to resolve the border conditions. However, these border conditions do not accurately reflect the actual conditions along the border of each of the faces. Thus, in accordance with the present invention, when filtering the faces of spherical texture projection 510 using environment map 520, links are provided to the image data of adjacent faces of spherical texture projection 510. For example, when filtering top face TOP along the border between top face TOP and front face FRONT, a link to front face FRONT is provided to the filtering process so that the data in front face FRONT can be used to filter top face TOP.

Figures 7A, 7B:
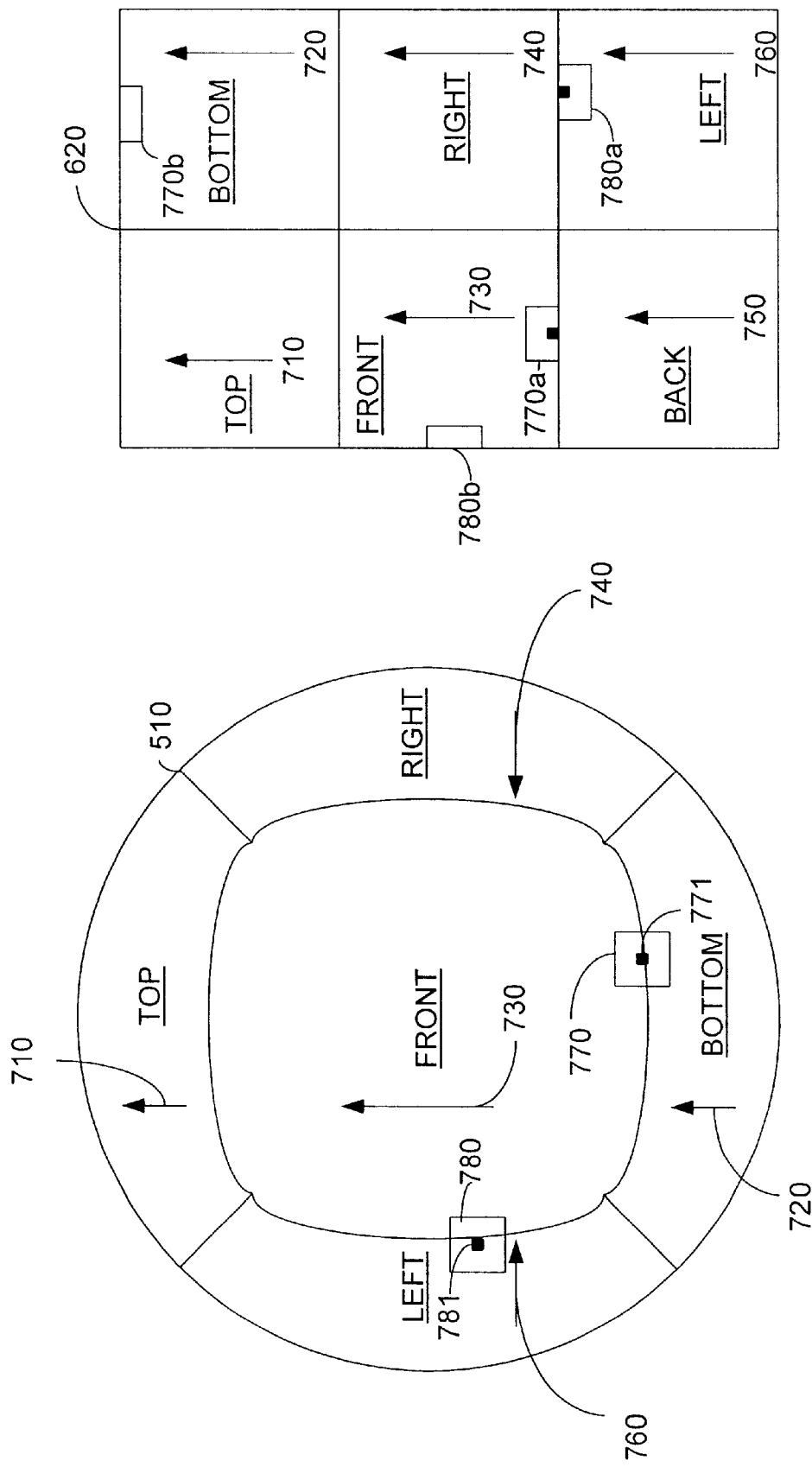
FIGS. 7(a) and 7(b) illustrate the orientation of faces of a spherical texture projection onto an environment map.

FIGS. 7(a) and 7(b) shows spherical texture projection 510 and environment map 620 having orientation arrows 710, 720, 730, 740, 750, and 760 as used in one embodiment of the present invention. Orientation arrows 710–760 conceptually illustrates the orientation of the faces in spherical texture projection 510 relative to the orientation in environment map 620. Also illustrated in FIG. 7(a) is a filtering mask 770 used to filter texel 771. As explained above a texel comprises one or more pixels. Filtering can be performed using texels or individual pixels. Texel 771 is on the border of front face FRONT and bottom face BOTTOM. Thus, filter mask 770 should include texels from both front face FRONT and bottom face BOTTOM. Conventional filtering techniques would either not filter texels near the border of each face or use specific border conditions to filter the texels near a border.

However, as illustrated in FIG. 7(b), the present invention includes the appropriate texels from bottom face BOTTOM to filter texel 771. Conceptually, filter mask 770 is separated into two partial filter masks 770a and 770b on environment map 720. Partial filter mask 770a includes front-face texels, i.e. texels from front face FRONT. Partial filter mask 770b includes the appropriate bottom-face texels, i.e. texels from bottom face BOTTOM. Similarly, a filter mask 780 for texel 781 on the border of front face FRONT and left face LEFT is conceptually separated into two partial filter masks 780a and 780b on environment map 720. Partial filter mask 780b includes front-face texels from front face FRONT. Partial filter mask 780a includes the appropriate left-face texels from left face LEFT.

In one embodiment of the present invention, pointers are included with environment map 620 for use in filtering. Specifically, one or more pointers are associated with each side of each face. The pointers point to the location of a row or column of texels in an adjacent face. The number of pointers associated with each side is dependent on the size of the filter masks. Specifically, a 5×5 filter mask would require 2 edge rows or columns of texels. Thus two pointers are used. In general for a N×N filter mask int(N/2) (i.e., the integer value of N divided by 2) pointers are used. In addition to a pointer to the necessary rows or columns, many embodiments of the present invention include a stride parameter. The stride parameter indicates the orientation of the row or column in the adjacent image relative to the actual image. In one embodiment the stride paramenter is a number that represents the number of texels (or pixels) to add to the current pointer location in the image to access the next texel (or pixel) in the row of the filter mask. For example, if the filter mask and image are aligned alike, the stride is equal to positive 1. If the filter mask is upside down relative to the image the stride is equal to negative 1. If the orientation of the filter mask and the image are offset by 90 degrees the stride would equal to the number of columns (i.e. Nc) in the image.

Figure 8:
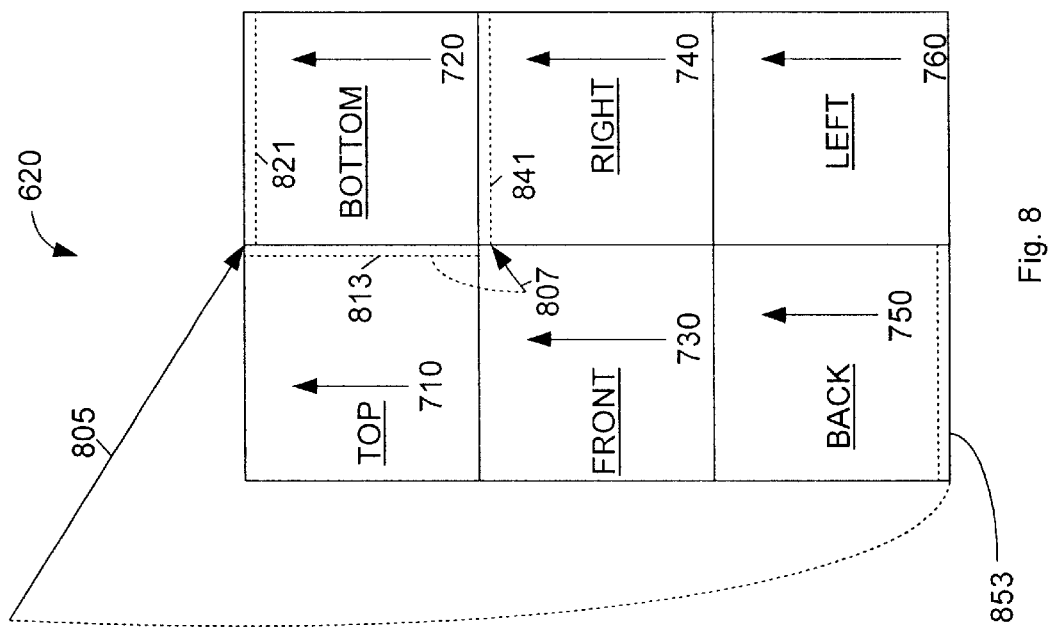
FIG. 8 is illustrates pointers associated with an environment map in accordance with one embodiment of the present invention.

FIG. 8 illustrates the use of pointers in accordance with one embodiment of the present invention. A back-face to bottom-face pointer 805, which is associated with side 853 of back face BACK, points to the beginning of top row 821 of bottom face BOTTOM. A stride parameter of positive one would indicate that top row 821 is oriented in the same direction as side 853. Additional pointers associated with side 853 would point to other rows near the top row of bottom face BOTTOM. Similarly, A top-face to right-face pointer 807, which is associated with left side 813 of top face TOP, points to the beginning of top row 841 of right face Right. A stride parameter of negative NC would indicate that top row 841 is oriented left as compared to up of side 853. Additional pointers associated with top side 813 would point to other columns near the top side of right face RIGHT.

Thus, in accordance with the present invention, filtering of faces of texture projections or three dimensional objects take into account texels or pixels from adjacent faces of the texture projection or three-dimensional objects. Specifically, while filtering near a border of a face of the texture projection, texels from adjacent faces are accessed by the filtering operation by referencing the texel values using the pointers and an appropriate offset based on the texel being filtered.

In the various embodiments of the present invention, novel structures and methods have been described for filtering faces of texture projections and three dimensional objects. By including pointers to adjacent faces, the borders of a face of the texture projection or three dimensional object can be fully filtered. The various embodiments of the structures and methods of this invention that are described above are illustrative only of the principles of this invention and are not intended to limit the scope of the invention to the particular embodiments described. For example, in view of this disclosure those skilled in the art can define other pointers, texture projections, three-dimensional objects, orientations, environment maps, curved surfaces, and so forth, and use these alternative features to create a method or system according to the principles of this invention. Thus, the invention is limited only by the following claims.

What is claimed is:

1. A method of filtering a texture map of a three-dimensional object having a first face and a second face, wherein the first face and the second face are stored in the texture map, the method comprising:
    filtering a first texel in the first face with a plurality of second-face texels from the second face, by:
        accessing the plurality of second-face texels using a first-face to second-face pointer associated with the first face;
        using a stride parameter to select the plurality of second-face pixels, wherein the stride parameter is equal to negative one when the first face is aligned oppositely with the second face; and
    filtering a second texel in the second face with a plurality of first-face texels from the first face.

2. The method of claim 1, wherein the stride parameter is equal to 1 when the first face is aligned with the second face.

3. A method of filtering a texture map of a three-dimensional object having a first face and a second face, wherein the first face and the second face are stored in the texture map, the method comprising:
    filtering a first texel in the first face with a plurality of second-face texels from the second face, by:
        accessing the plurality of second-face texels using a first-face to second-face pointer associated with the first face;
        using a stride parameter to select the plurality of second-face pixels, wherein the second face comprises Nc columns of texels and wherein the stride parameter is equal to Nc when the second face is rotated ninety degrees from the first face; and
    filtering a second texel in the second face with a plurality of first-face texels from the first face.

4. A method of filtering a texture map of a three-dimensional object having a first face and a second face, wherein the first face and the second face are stored in the texture map, the method comprising:
    filtering a first texel in the first face with a plurality of second-face texels from the second face, by:
        accessing the plurality of second-face texels using a first-face to second-face pointer associated with the first face;
        using a stride parameter to select the plurality of second-face pixels, wherein the second face comprises Nc columns of texels and wherein the stride parameter is equal to negative Nc when the second face is rotated negative ninety degrees from the first face; and
    filtering a second texel in the second face with a plurality of first-face texels from the first face.

5. The method of claim 1, wherein the first face is adjacent said second face on the three dimensional object.

6. The method of claim 1, wherein the three dimensional object is a texture projection of an environment and the texture map is an environment map.

7. The method of claim 1, wherein the first face is a tetragonal curved surface.

8. The method of claim 1, further comprising filtering a second texel in the first face with a plurality third-face texels from a third face of the three-dimensional object.

9. The method of claim 1, wherein the plurality of second-face texels are defined by a partial filter mask.

10. The method of claim 1, wherein the first texel comprises exactly one pixel.

11. A texture map representing a three-dimensional object comprising:

a first face having a first side;

a second face having a first side;

a first pointer associated with the first side of the first face and pointing to the first side of the second face; and a first stride parameter associated with the first pointer, wherein the second face comprise Nc columns of texels and wherein the first stride parameter is equal to Nc if the second face is rotated 90 degrees relative to the first face.

12. The texture map of claim 11, further comprising a second pointer associated with the first side of the second face and pointing to the first side of the first face.

13. The texture map of claim 11, wherein the first stride parameter is equal to one when the first face and the second face are aligned.

14. The texture map of claim 11, wherein the three-dimensional object is a texture projection for an environment surrounding a user.

15. The texture map of claim 11, wherein the texture map is an environment map.

16. The texture map of claim 11, further comprising a third face.

17. The texture map of claim 11, wherein the first face represents a tetragonal curved surface.

* * * * *